United States Patent
Skinlo et al.

(10) Patent No.: US 7,951,480 B1
(45) Date of Patent: May 31, 2011

(54) SEPARATOR BAG FOR USE IN ELECTROCHEMCIAL CELL

(75) Inventors: David M. Skinlo, Valencia, CA (US); Hiroyuki Yumoto, Stevenson Ranch, CA (US); David L. DeMuth, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 2269 days.

(21) Appl. No.: 10/697,537

(22) Filed: Oct. 29, 2003

(51) Int. Cl.
*H01M 10/02* (2006.01)
*H01M 10/04* (2006.01)

(52) U.S. Cl. ........ 429/128; 429/122; 429/129; 429/130; 429/131; 429/135; 429/136; 429/139; 29/623.1; 29/623.2

(58) Field of Classification Search ............... 429/136, 429/139
See application file for complete search history.

(56) References Cited

U.S. PATENT DOCUMENTS

| | | | |
|---|---|---|---|
| 3,558,358 A | | 1/1971 | Ropp |
| 3,703,417 A | | 11/1972 | Rosa et al. |
| 3,861,936 A | | 1/1975 | Winter |
| 4,070,528 A | | 1/1978 | Bergum et al. |
| 4,434,214 A | | 2/1984 | Suzuki |
| 4,476,203 A | * | 10/1984 | Robert et al. ............ 429/139 |
| 4,539,271 A | * | 9/1985 | Crabtree ................ 429/94 |
| 4,618,546 A | | 10/1986 | Simonton et al. |
| 5,089,027 A | | 2/1992 | Rossoll et al. |
| 5,314,507 A | * | 5/1994 | Rossoll ................. 29/623.4 |
| 5,616,434 A | * | 4/1997 | Redden et al. ........... 429/136 |
| 5,674,641 A | * | 10/1997 | Cheu .................... 429/306 |
| 6,001,503 A | * | 12/1999 | Hercamp et al. ......... 429/139 |
| 6,004,693 A | | 12/1999 | Fukuda et al. |
| 6,277,520 B1 | | 8/2001 | Moutsios et al. |
| 6,348,283 B1 | | 2/2002 | Mas et al. |
| 6,458,483 B1 | | 10/2002 | Hamano et al. |
| 6,475,665 B1 | | 11/2002 | Okamoto et al. |
| 6,551,745 B2 | | 4/2003 | Moutsios et al. |
| 6,593,028 B1 | | 7/2003 | McCormick |
| 6,627,347 B2 | | 9/2003 | Fukuda et al. |
| 2002/0119367 A1 | | 8/2002 | Watanabe et al. |
| 2002/0192542 A1 | | 12/2002 | Luski et al. |

FOREIGN PATENT DOCUMENTS

| | | |
|---|---|---|
| EP | 1 205 987 A2 | 5/2002 |
| JP | 57-111951 A | 7/1982 |
| JP | 60-023964 A | 2/1985 |
| JP | 60-065481 A | 4/1985 |
| JP | 60-097547 A | 5/1985 |
| JP | 63-128567 A | 6/1988 |
| JP | 01-157061 A | 6/1989 |

* cited by examiner

*Primary Examiner* — Ula C Ruddock
*Assistant Examiner* — Alix Echelmeyer
(74) *Attorney, Agent, or Firm* — Gavrilovich, Dodd & Lindsey

(57) ABSTRACT

An electrode system includes one or more separator materials formed into a bag having at least two seams. The seams are positioned so as to define the perimeter of a pocket configured to receive an electrode within the bag. At least one gap is formed between seams adjacent to one another along the perimeter of the pocket. Additionally, at least one of the seams includes a spacer positioned between portions of the one or more separator materials joined by the at least one seam.

38 Claims, 16 Drawing Sheets

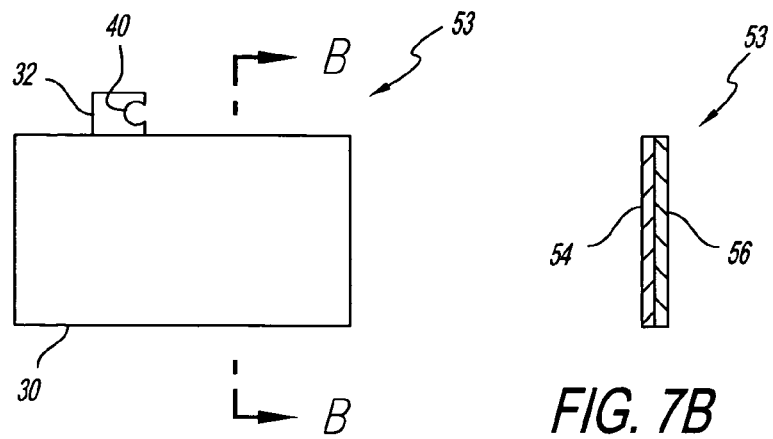
FIG. 7A
FIG. 7B
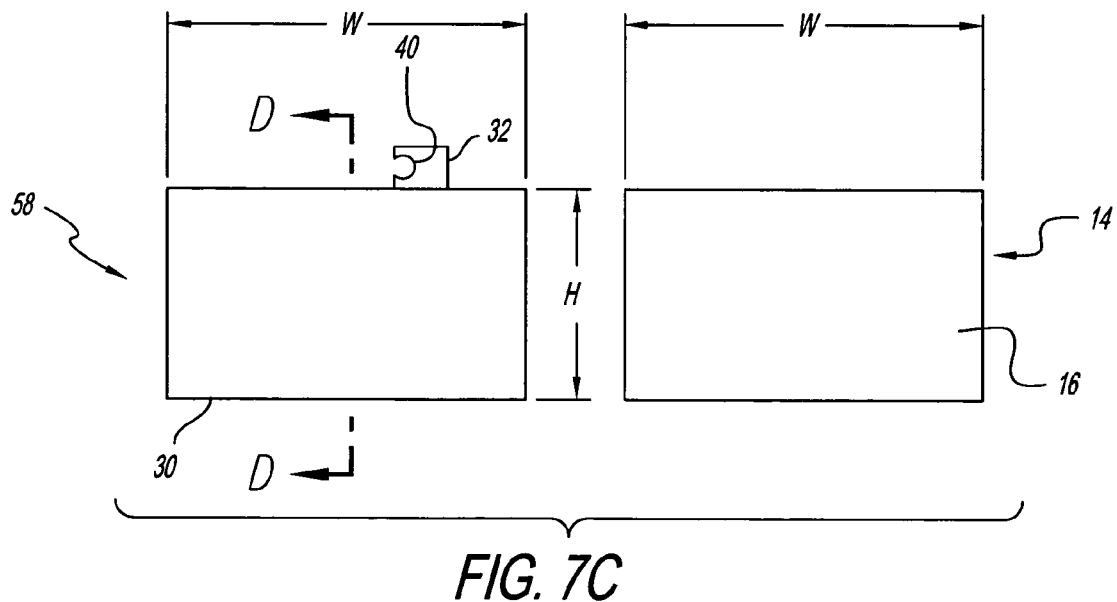
FIG. 7C
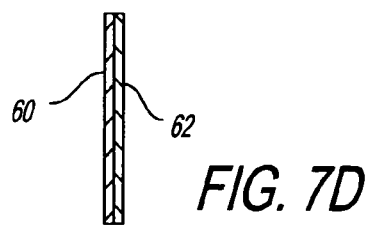
FIG. 7D

SEPARATOR BAG FOR USE IN ELECTROCHEMCIAL CELL

CROSS-REFERENCE TO RELATED APPLICATIONS

This application is related to U.S. patent Ser. No. 10/630,541, filed Jul. 29, 2003, entitled "Battery Electrode Assembly and Fabrication Method Therefor" and incorporated herein in its entirety which claims priority to Provisional Patent Application Ser. No. 60/447,802, filed on Feb. 14, 2003, entitled "Battery Electrode Assembly and Fabrication Method Therefor" and incorporated herein in its entirety.

FIELD

The present invention relates to electrochemical devices, and more particularly to separator bags for use in the electrochemical cells.

BACKGROUND

A variety of batteries employ a stack of electrodes having anodes alternating with cathodes. These electrode stacks can employ bags constructed of a separator material. Typically, the cathodes in the stack are positioned in a separator bag while the anodes are not positioned in separator bags. This arrangement places the separator between adjacent anodes and cathodes.

The separator bags can be formed by bonding edges of the separator material together so as to form an envelope. The sides are bonded together using welds or mechanical seals to form seams that bring one side of the separator bag into contact with another side of the separator bag. An electrode is inserted into the bag such that edges of the electrode are adjacent to the seams of the bag. Because the electrode is thicker than the seams, the bag is pinched together adjacent to the edges of the electrode. This pinching can cause wrinkles to develop in the separator bag. The wrinkles can cause lithium dendrite formation and can accordingly affect battery performance. As a result, there is a need for an improved separator bag.

SUMMARY

An electrode system is disclosed. The electrode system includes one or more separator materials formed into a bag having at least two seams. The seams are positioned so as to define the perimeter of a pocket configured to receive an electrode. At least one gap is formed between seams adjacent to one another along the perimeter of the pocket. Additionally, at least one of the seams includes a spacer positioned between portions of the one or more separator materials joined by at least one seam.

Another embodiment of the electrode system includes an electrode and one or more separator materials. The one or more separator materials are formed into a bag having at least two seams that immobilize one portion of the one or more separator materials relative to another portion of the one or more separator materials. The seams define the perimeter of a pocket that surrounds the electrode.

An electrochemical cell is also disclosed. The cell includes an electrode system having a cathode positioned in a pocket of a separator bag. The cell also includes an anode stacked on the separator bag. The perimeter of the portion of the anode positioned adjacent to the bag is matched to the perimeter of the side of the bag adjacent to the anode such that the perimeter of the anode is aligned with the perimeter of the separator bag.

An electrode stacking system for use in forming an electrochemical cell is also disclosed. The system includes a stacking structure configured to be positioned in the case of an electrochemical cell. The stacking structure includes a plurality of electrically conducting posts that are each configured to receive a plurality of electrodes. The posts are mechanically connected to one another and electrically isolated from one another. In some instances, the system also includes a cell cover configured to be attached to the stacking structure. The cell cover serves as the cover of the electrochemical cell upon positioning the stacking structure in the electrochemical cell.

A method of forming an electrode system is also disclosed. The method includes joining regions of one or more separator materials so as to form the seams of a separator bag. The seams are positioned so as to define a perimeter of a pocket configured to receive an electrode within the bag. The seams are also arranged such that at least one gap is formed between seams adjacent to one another along the perimeter of the pocket. Additionally, at least one of the seams formed so as to include a spacer positioned between regions of the separator material joined by the seam.

The spacers can have a thickness greater than 10 µm along the one or more sides of the spacer that define the pocket. In some instances, the spacers have a thickness greater than 2%, 10% or 50% of the thickness of an electrode positioned in the pocket. In one example, the spacers can have a thickness in a range of 80% to 120% of the electrode thickness.

The spacers can include an adhesive that bonds to the separator material. The adhesive can include one or more components selected from the group consisting of acrylic, rubber, cellulose and silicone.

The separator bag can include a lower edge extending between lateral edges. The bag can also include one or more lateral seams positioned along a lateral edge of the separator bag and at least one lower seams positioned along the lower edge of the separator bag. In some instances, the one or more lateral seams are not positioned above a distance from the lower seam, the distance being equal to 50% of the electrode height. The electrode height is measured along the edge of the electrode adjacent to the lateral seam.

An electrode positioned in the separator bag can include a tab that extends from a side of the separator bag. The tab can include a tab opening that extends through the tab. In some instances, the tab opening is open to an edge of the tab.

BRIEF DESCRIPTION OF THE FIGURES

FIG. 7A through FIG. 7D illustrate suitable constructions for an anode and a cathode to be used with an electrochemical cell employing a separator bag.

DETAILED DESCRIPTION

A separator bag for use with an electrochemical cell is disclosed. The separator bag includes a plurality of seams that join different regions of a separator material. The seams are positioned so as to define the perimeter of a pocket for receiving an electrode. The pocket can be configured to receive the electrode such that edges of the electrode are positioned adjacent to the seams. The seams can include spacers that increase the thickness of the seam beyond the thickness of prior seams. The increased thickness of the seam reduces the pinching of the separator material adjacent to the edges of the electrode. The reduced pinching can reduce the wrinkles in the separator material and can accordingly reduce lithium dendrite formation. As a result, the spacers can enhance the performance of a battery employing the separator bag. Additionally, a gap can be formed between at least two of the seams positioned along the perimeter of the pocket. The gap can permit the electrolyte to flow into and out of the bag.

Figure 1:
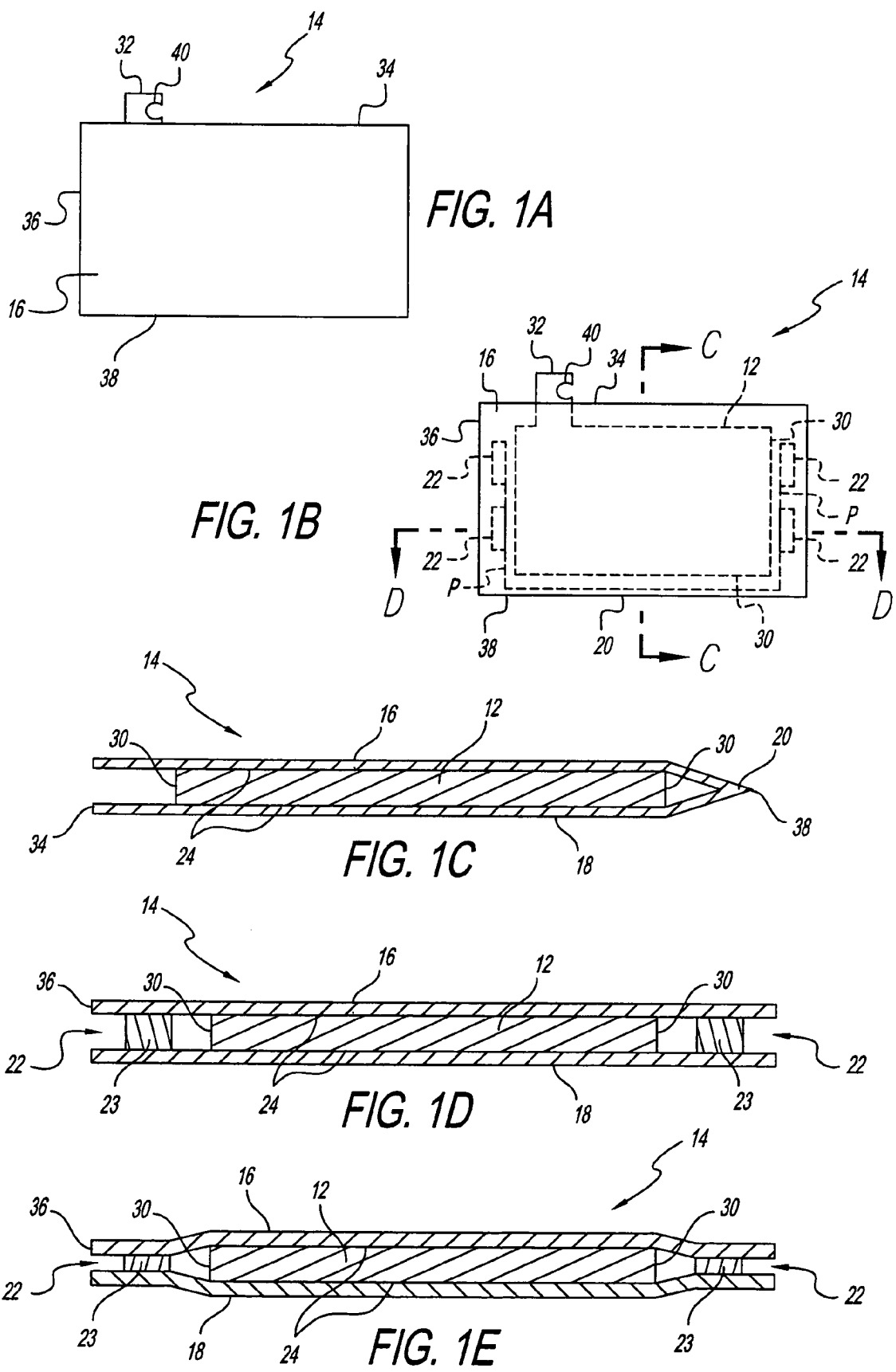
FIG. 1A is a sideview of an electrode system that includes an electrode positioned in a separator bag.
FIG. 1B is the sideview of FIG. 1A with dashed lines showing the location of components within the bag that are not evident from outside of the separator bag. The dashed lines illustrate the location of an electrode and seams within the separator bag. The dashed lines also illustrate the location of a pocket defined by the seams. A portion of the seams include a spacer.
FIG. 1C is a cross section of the electrode system shown in FIG. 1A taken along a line extending between the brackets labeled C.
FIG. 1D and FIG. 1E illustrate possible cross sections of the electrode system shown in FIG. 1A taken along a line extending between the brackets labeled D.

FIG. 1A through FIG. 1E illustrate an electrode system. FIG. 1A is a sideview of the electrode system. FIG. 1B is the sideview of FIG. 1A with dashed lines showing the location of components within the bag that are not evident from outside of the separator bag. FIG. 1C is a cross section of the electrode system shown in FIG. 1A taken along a line extending between the brackets labeled C. FIG. 1D is a cross section of the electrode system shown in FIG. 1A taken along a line extending between the brackets labeled D. FIG. 1E is another possible cross section of the electrode system shown in FIG. 1A taken along a line extending between the brackets labeled D.

The electrode system includes an electrode 12 and a separator bag 14. The separator bag 14 includes a first side 16 and second side 18. The separator bag 14 includes a lower seam 20 and lateral seams 22 that each immobilize a portion of the first side 16 relative to a portion of the second side 18. A fold in the separator material serves as the lower seam 20. The lateral seams 22 can include spacers 23 positioned between the first side 16 and the second side 18. The seams are arranged so as to define the perimeter of a pocket 24 configured to receive the electrode 12. The lines labeled P in FIG. 1B illustrate the perimeter of the pocket 24. The pocket 24 is defined such that movement of the electrode 12 within the pocket 24 is at least partially constrained.

The seams are arranged such that at least one gap is formed between seams adjacent to one another along the perimeter of the pocket 24. The gap between adjacent seams can allow electrolyte in to flow into and out of the pocket 24. Additionally, the gap can reduce the total volume of spacers 23 that are required in the bag. Accordingly, the gap can increase the free space in an electrochemical cell that includes the electrode system.

The electrode 12 is received in the pocket 24 with the edges 30 of the electrode 12 adjacent to the seams. In some instances, a spacer 23 is thick enough to prevent contact between the first side 16 and the second side 18 along the length of a seam. The spacers employed in the electrode system of FIG. 1D are thicker than the spacers employed in the electrode system of FIG. 1E. The thicker spacers shown in FIG. 1E decrease the degree to which the separator material is pinched together adjacent to the edge 30 of the electrode 12. Decreasing the degree of pinching can reduce wrinkling of the separator material on the first side 16 and/or on the second side 18 of the separator bag 14. As noted above, this wrinkling can be a source of lithium dendrite formation. Because the spacers 23 can reduce this wrinkling, the spacers 23 can reduce lithium dendrite formation.

The electrode 12 includes a tab 32 that extends from the separator bag 14. Although the electrode 12 is shown with a single tab 32, the electrode 12 can include a plurality of tabs 32. Although the tab 32 is shown extending from an upper edge 34 of the separator bag 14, the electrode 12 can include one or more tabs 32 extending from a lateral edge 36 of the separator bag 14 and/or from a lower edge 38 of the separator bag 14.

The tab 32 includes a tab opening 40. The tab opening 40 is open to an edge of the tab 32. Alternatively, the tab opening 40 can be positioned on the tab 32 such that the tab 32 surrounds the opening. As will be discussed in more detail below, the tab openings 40 can be employed to align electrodes 12 during fabrication of an electrochemical cell.

Although the separator bag 14 of FIG. 1A through FIG. 1E illustrates seams positioned adjacent to three edges 30 of the electrode 12, the separator bag 14 can be constructed so as to have seams adjacent to only two edges 30 of the electrode 12. Accordingly, the seams can define a pocket 24 having only two sides. In the event of a round electrode 12, the separator bag 14 can have seams adjacent to one edge 30 of the electrode 12.

Figure 2:
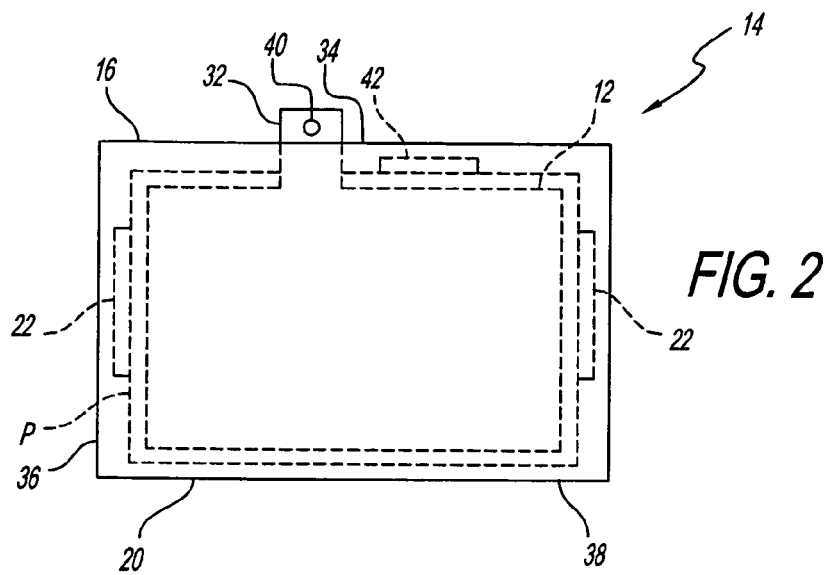
FIG. 2 is a sideview of an electrode system having a separator bag with seams located on four sides of an electrode positioned in the separator bag.

The separator can include seams on four sides as illustrated in FIG. 2. FIG. 2 is a sideview of an electrode system. The dashed lines in FIG. 2 illustrate the location of seams positioned between the first side 16 and the second side and are not evident from the outside of the separator bag 14. The separator bag 14 includes lower seams 20, lateral seams 22 and upper seams 42. Accordingly, the seams define a pocket that surrounds the electrode 12 as shown by the dashed lines labeled P. Seams that define a pocket surrounding the electrode 12 can serve to further immobilize the electrode 12 within the pocket and reduce shifting of the electrode 12 within the pocket.

Figure 3A:
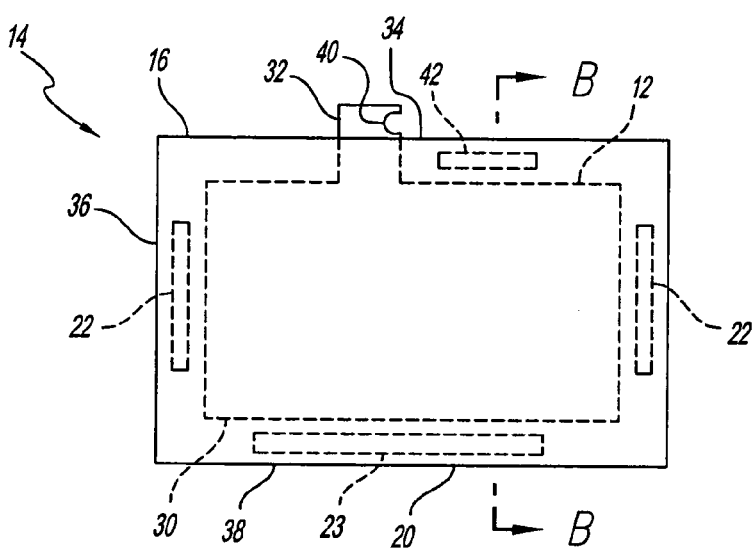
FIG. 3A is a sideview of an electrode system having a separator bag with a spacer that defines a lower seam along a lower edge of the separator bag. The lower edge of the separator bag is folded.
Figure 3B:
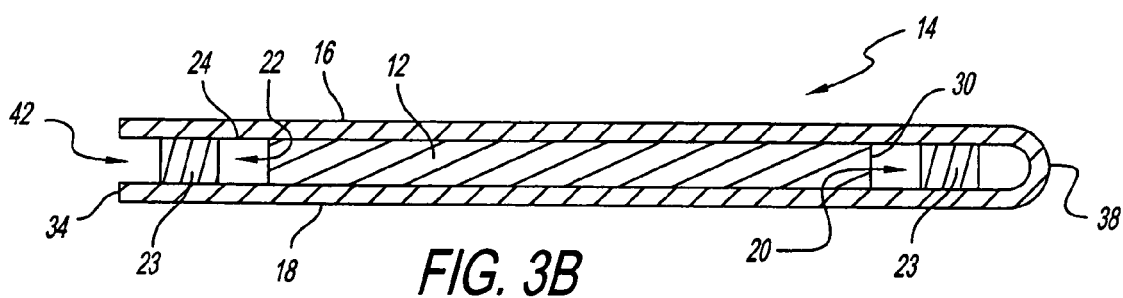
FIG. 3B and FIG. 3C illustrate possible cross sections of the electrode system of FIG. 3A taken along a line extending between the brackets labeled B.
Figure 3C:
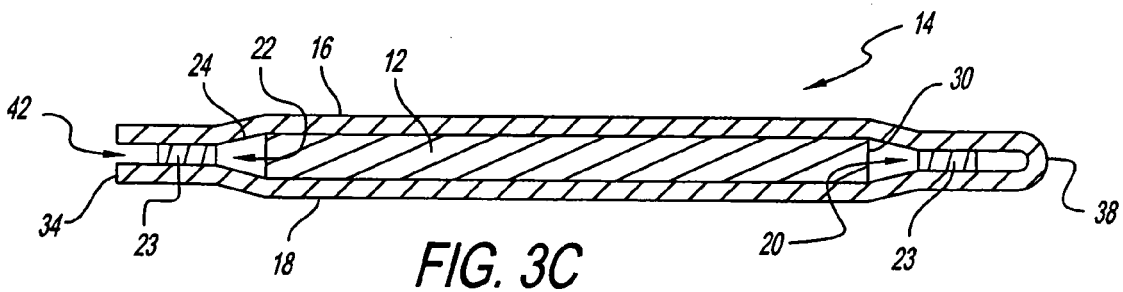

A lower seam 20 can also include a spacer 23. FIG. 3A is a sideview of an electrode system. The dashed lines illustrate the location of seams that are located between the first side 16 and the second side 18 and are not evident from the outside of the separator bag 14. FIG. 3B is a cross section of the electrode system of FIG. 3A taken along a line extending between the brackets labeled B. FIG. 3C is another possible cross section of the electrode system of FIG. 3A taken along a line extending between the brackets labeled B. The electrode system of FIG. 3B employs thicker spacers than the electrode system of FIG. 3C. The bottom edge of the separator bag 14 includes a spacer 23 that forms a seam between the electrode 12 and a fold of the separator material. Accordingly, the spacer 23 serves as a lower seam 20 that defines a portion of the pocket. The use of the spacer 23 on the bottom edge of the separator bag 14 can serve to reduce wrinkling that can be caused by a fold on the bottom edge of the separator bag 14.

Figure 4A:
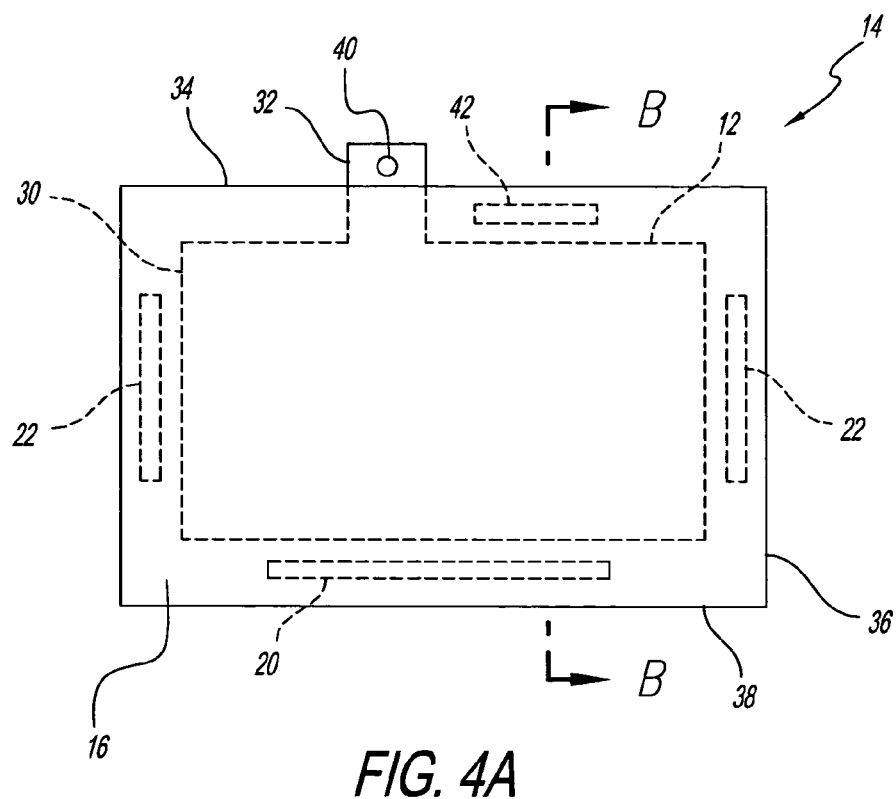
FIG. 4A is a sideview of an electrode system having a separator bag with a spacer that defines a lower seam along a lower edge of the separator bag. The lower edge of the separator bag is not folded.
Figure 4B:
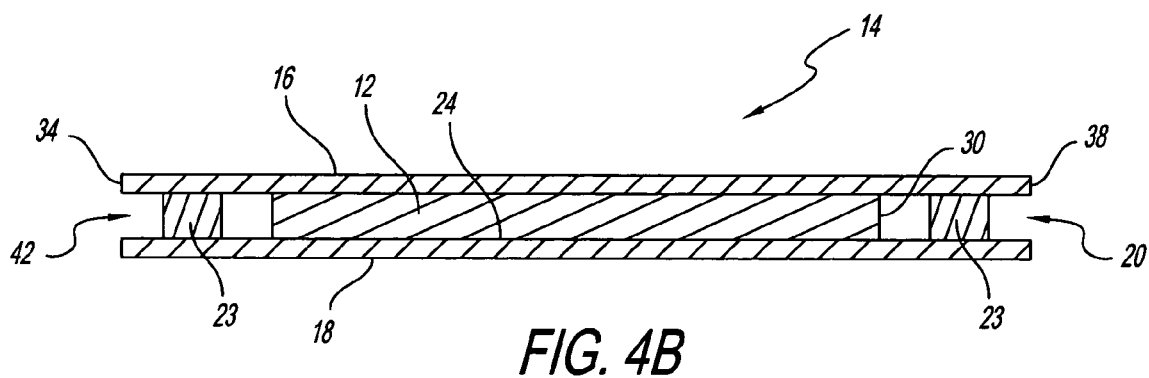
FIG. 4B and FIG. 4C illustrate possible cross sections of the electrode system shown in FIG. 4A taken along a line extending between the brackets labeled B.
Figure 4C:
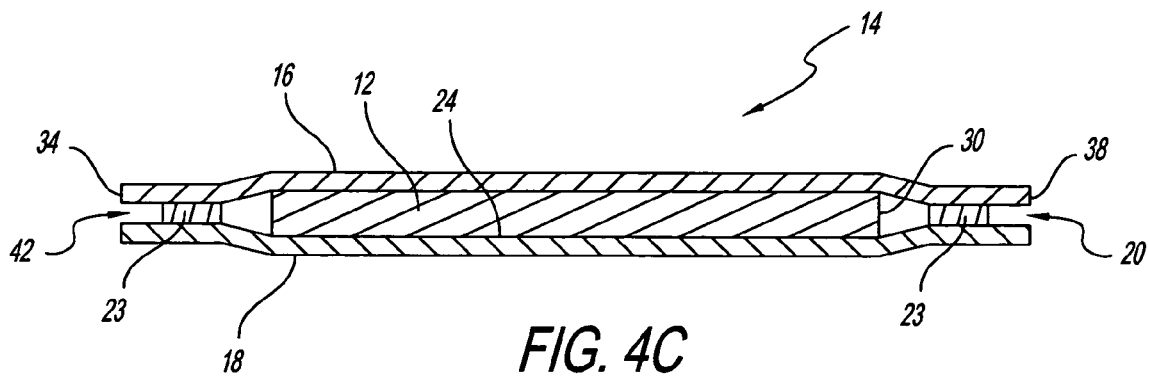

Although the bottom edge of the separator bag 14 is shown above as having a fold in the separator material, the bottom edge of the separator bag 14 need not include a fold in the separator material. FIG. 4A is a side view of an electrode system. FIG. 4B is a cross section of the electrode system shown in FIG. 4A taken along a line extending between the brackets labeled B. FIG. 4C is another possible cross section of the electrode system of FIG. 4A taken along a line extending between the brackets labeled B. The electrode system of FIG. 4B employs thicker spacers than the electrode system of FIG. 4C. The separator material is not folded along the bottom edge. As a result, the first side 16 and the second side 18 of the separator bag 14 are formed of independent separator materials. The separator material on the first side 16 of the separator bag 14 can be the same as or different from the separator material on the second side 18 of the separator bag 14.

Figure 5A:
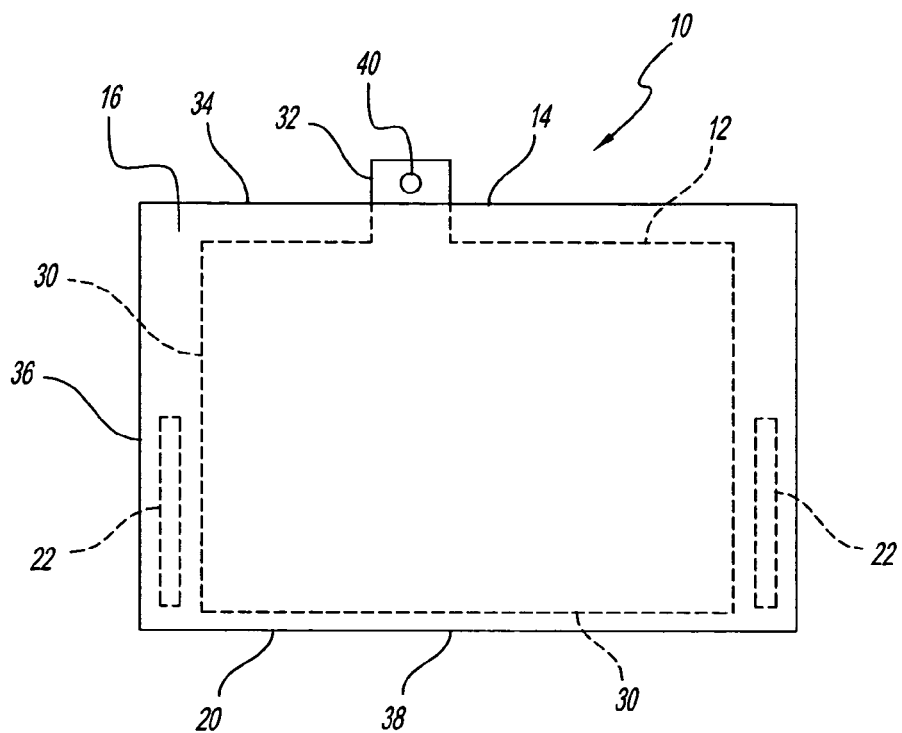
FIG. 5A is a sideview of an electrode system having a separator bag with lateral seams that extend only part way up the lateral edge of the separator bag.
Figure 5B:
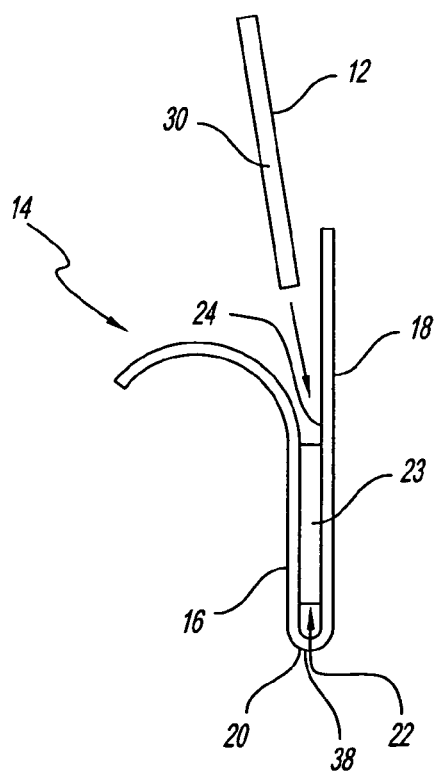
FIG. 5B is a sideview of the material in the upper portion of the separator bag of FIG. 5A being pulled apart to provide space for insertion of an electrode into the separator bag.

In some instances, the lateral seams 22 extend only part way up the first side 16 and the second side 18 as illustrated in FIG. 5A. The dashed lines illustrate the location of seams that are located between the first side 16 and the second side 18 and are not evident from the outside of the separator bag 14. The lateral seams 22 extend only part way up the first side 16 and the second side 18. As a result, the upper portions of the first side 16 and second side 18 can be pulled apart to open the separator bag 14 as illustrated in FIG. 5B. During fabrication of the electrode system, the electrode 12 often must be placed into the separator bag 14 after the formation of one or more seams. The ability to open the separator bag 14 can simplify the process of placing the electrode 12 into the separator bag 14. Additionally, reducing the volume required by the spacers 23 can increase the free space within an electrochemical cell employing the separator bag 14.

Although the location of the lateral seams 22 is described in the context of both lateral seams 22, in some instances, only one of the lateral seams 22 extend a limited distance up the first side 16 and the second side 18. The separator bag 14 can be opened when the lateral seams 22 are not positioned and do not extend above a particular point on the first side 16 or the second side 18. In some instances, the particular point is at a distance equal to 80% of the electrode 12 height from the lower seam 20. In another instances, the particular point is at a distance of 50% of the electrode 12 height from the lower seam 20.

Figure 6A:
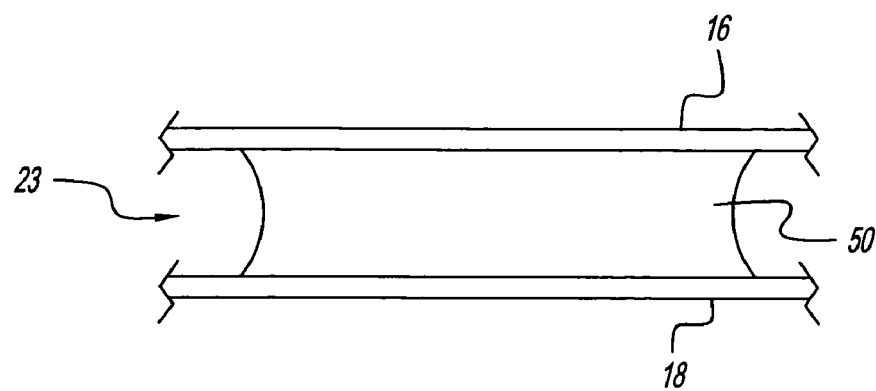
FIG. 6A through FIG. 6C illustrate different spacer constructions that are suitable for use with a separator bag.
Figure 6B:
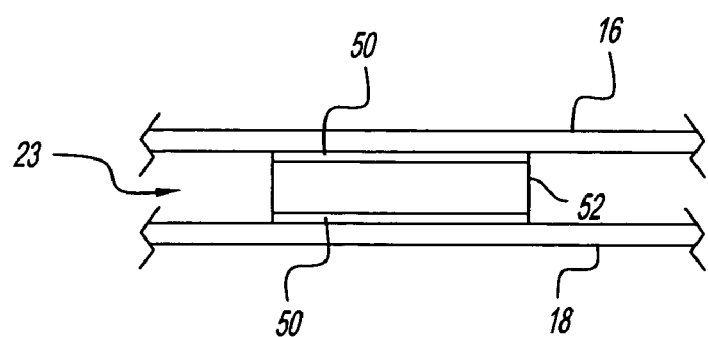
Figure 6C:
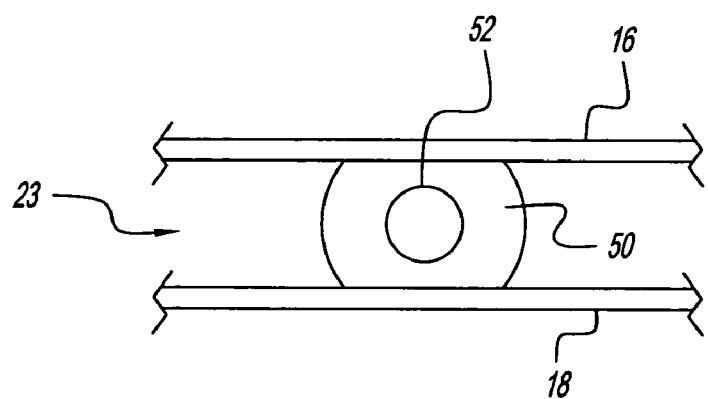

FIG. 6A illustrate a suitable spacer 23 for use in forming a seam of the separator bag 14. The spacer 23 includes a layer of an adhesive 50. FIG. 6B illustrates another suitable spacer 23 for use with the separator bag 14. The spacer 23 includes a substrate 52 positioned between adhesive 50 layers. The adhesive 50 immobilize the substrate 52 between the first material and the second material. The thickness of the substrate 52 can be adjusted to change the thickness of the spacer 23. FIG. 6C is another embodiment of a spacer 23 that is suitable for use with the separator bag 14. The spacer 23 includes a substrate 52 encapsulated within an adhesive 50. Suitable adhesives 50 for use as a spacer or with a spacer 23 do not interfere with the operation of the battery. For instance, the adhesive should not cause capacity degradation. Examples of suitable adhesives 50 for use as a spacer or use with a spacer include, but are not limited to, acrylic, rubber, cellulose and silicone. Suitable substrates for use with a spacer include, but are not limited to, KAPTON polyimide films.

The thickness of a spacer 23 refers to the thickness of the side(s) of the spacer 23 that defines the pocket. On at least the side(s) of the spacer 23 defining the pocket, the spacer 23 preferably has a thickness sufficient to hold the first side 16 apart from the second side 18. The spacer thickness can change with the thickness of the electrode. For instance, the spacer thickness can be increased for use with thicker electrodes. In some instances, the spacer thickness is greater than 20%, or 50% of the electrode thickness. In one example, the spacers have a thickness in a range of 80% to 120% of the electrode thickness. In some instances, the spacer thickness is greater than 10 μm or 50 μm.

As noted above, an electrochemical cell can be constructed by stacking electrodes on top of one another. The stack is generally formed by alternating electrodes that are positioned in a separator bag with electrodes that are not positioned in a separator bag. In some instances, the electrodes within the separator bag are cathodes and the electrodes that are not positioned within a separator bag are anodes.

FIG. 7A and FIG. 7B illustrate one example of a suitable cathode 53 for use with the electrode system. FIG. 7A is a side view of the cathode 53 and FIG. 7B is a cross-section of the cathode 53 shown in FIG. 7A taken along a line extending between the brackets labeled B. The cathode 53 includes a substrate 54, a positive active medium 56 and one or more tabs 32. Although the positive active medium is shown on one side of the substrate, the positive active medium can be positioned on both sides of the substrate. The tab 32 and the substrate 54 can be constructed of a continuous material. Alternately, the tab 32 and the substrate 54 can be different materials. Suitable substrates 54 include, but are not limited to, mesh, porous or solid substrates. Suitable substrate materials include, but are not limited to aluminum, copper and/or titanium. The positive active medium 56 can be formed on the substrate 54 using a variety of techniques including laminating, calendaring, vapor deposition, etc. A positive active medium 56 includes one or more positive active materials.

The positive active medium 56 can also optionally includes a binder and/or a conductivity enhancer. The positive active medium 56 can include one or more other components. For instance, the positive active medium 56 can include one or more components in common with an electrolyte that is present in the battery before discharge of the battery. As an example, the positive active medium 56 can include solvent molecules.

FIG. 7C and FIG. 7D illustrate one example of a suitable anode 58 for use with the electrode system of FIG. 7A and FIG. 7B. FIG. 7C compares a side view of the anode 58 and a sideview of the separator bag 14. FIG. 7D is a cross-section of the anode 58 shown in FIG. 7C taken along a line extending between the brackets labeled D. The anode 58 includes a substrate 60, a negative active medium 62 and a tab 32. Although the negative active medium is shown on one side of the substrate, the negative active medium can be positioned on both sides of the substrate. The tab 32 includes a tab opening 40. As is evident in FIG. 7C, the tab opening 40 is open to an edge of the tab 32. Alternatively, the tab opening 40 can be positioned on the tab 32 such that the tab 32 surrounds the opening. As will be discussed in more detail below, the tab openings 40 can be employed to align electrodes 12 during fabrication of an electrochemical cell.

The tab 32 on the anode 58 is positioned in a different location than the tab 32 on the cathode 53. As a result, the tab 32 of the anode 58 is not aligned with the tab 32 of the cathode 53 when the electrodes 12 are stacked on top of one another. The tab 32 and the substrate 60 can be constructed of a continuous material. Alternately, the tab 32 and the substrate 60 can be different materials. Suitable substrates 60 include, but are not limited to, mesh, porous or solid substrates. Suitable substrate materials include, but are not limited to aluminum, copper and/or titanium. The negative active medium 62 can be formed on the substrate 60 using a variety of techniques including laminating, calendaring, vapor deposition, etc. A negative active medium 62 includes one or more negative active materials. The negative active medium 62 can also optionally includes a binder and/or a conductivity enhancer. The negative active medium 62 can include on or more other components. For instance, the negative active medium 62 can include one or more components in common with the electrolyte before discharge of the battery. As an example, the negative active medium 62 can include solvent molecules.

FIG. 7C includes also shows the first side 16 of a separator bag 14. The first side 16 of the separator bag 14 has about the same width, W, and length, height, H, as the flat side of the anode 58. The tab 32 is not included in the height of the anode 58. When the electrode 12 stack is formed during fabrication of the electrochemical cell, the flat side of the anode 58 is positioned on the first side 16 of the separator bag 14. Because the separator bag 14 and the anode 58 have about the same width and height, the perimeter of the anode 58 and the perimeter of the separator bag 14 can be aligned with one another. As a result, the separator bag 14 and anode 58 construction can help align the anode 58 with the separator bag 14.

Although the anode 58 is illustrated as having the same size as the separator bag 14, the anode 58 and the cathode 53 can have different dimensions. Additionally, in some instances, an electrochemical cell is constructed with the anodes 58 positioned in separator bag 14 and cathode(s) 53 not positioned in separator bag 14.

Although the anode 58 and the cathode 53 are illustrated with a width that exceeds the height, the anode 58 and cathode 53 can be constructed with a width less than the height. Additionally, the separator bag 14 can be constructed with the width that is less than the height.

Figure 8A:
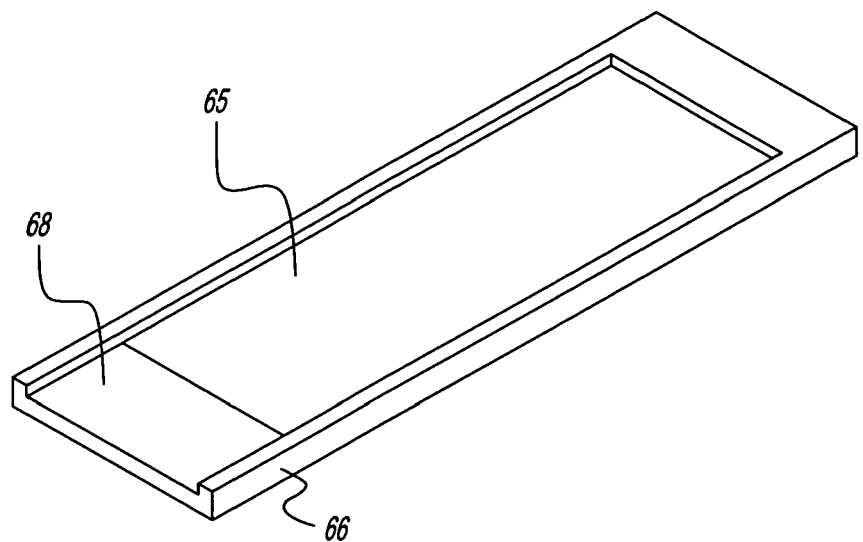
FIG. 8A through FIG. 8G illustrate a method of forming an electrode system having an electrode positioned in a separator bag.
Figure 8B:
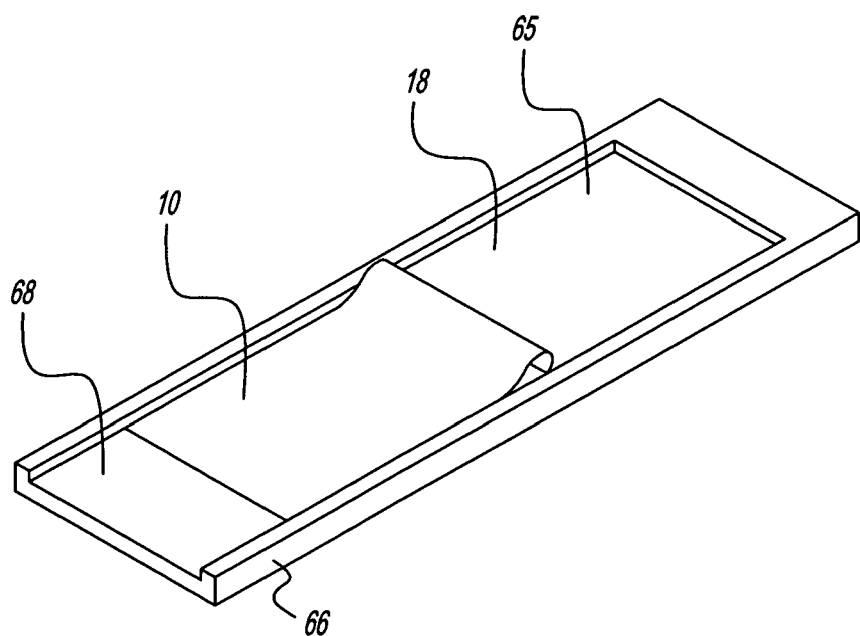

FIG. 8A through FIG. 8F illustrate a method of forming a separator bag. A separator material 65 is positioned in a folding structure 66. The folding structure 66 has a recess 68 configured to receive the separator material such that movement of the separator material is restricted in two or more directions. Suitable separator materials allow ions to pass through the separator. Examples of suitable separator materials include, but are not limited to, polyethylene, polypropylene and mixtures thereof. In some instances, the separator materials includes multiple layers of material. An unrestricted edge of the separator material that will become the upper edge of the separator bag is pushed toward the opposite restricted edge of the folding structure 66 as shown in FIG. 8B.

Figure 8C:
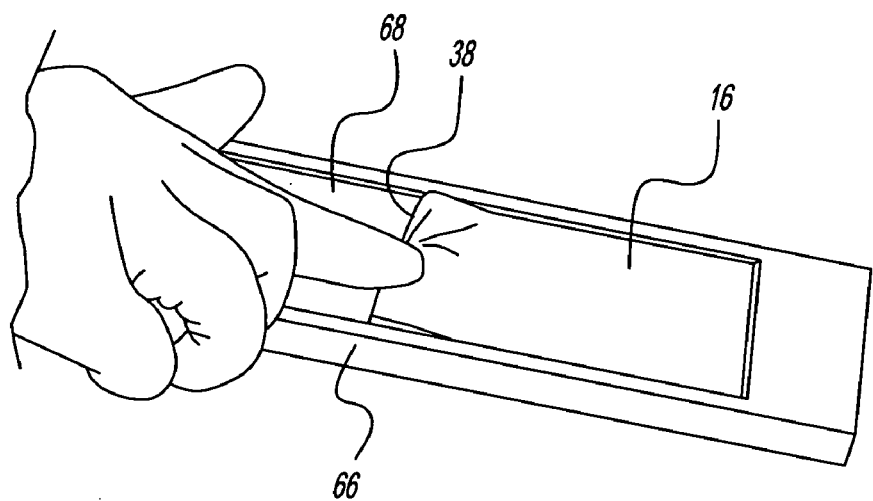
Figure 8D:
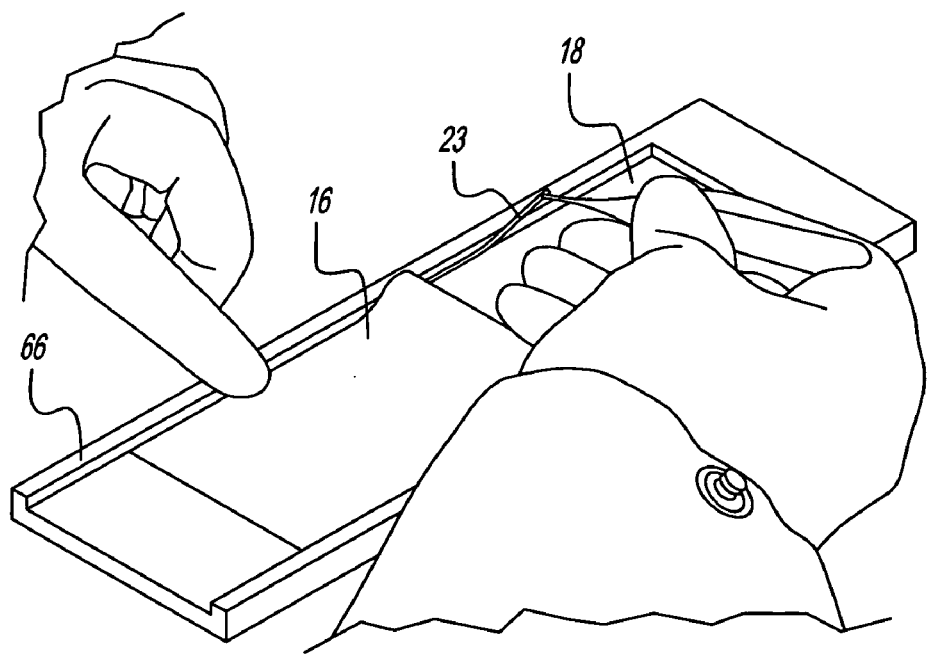
Figure 8E:
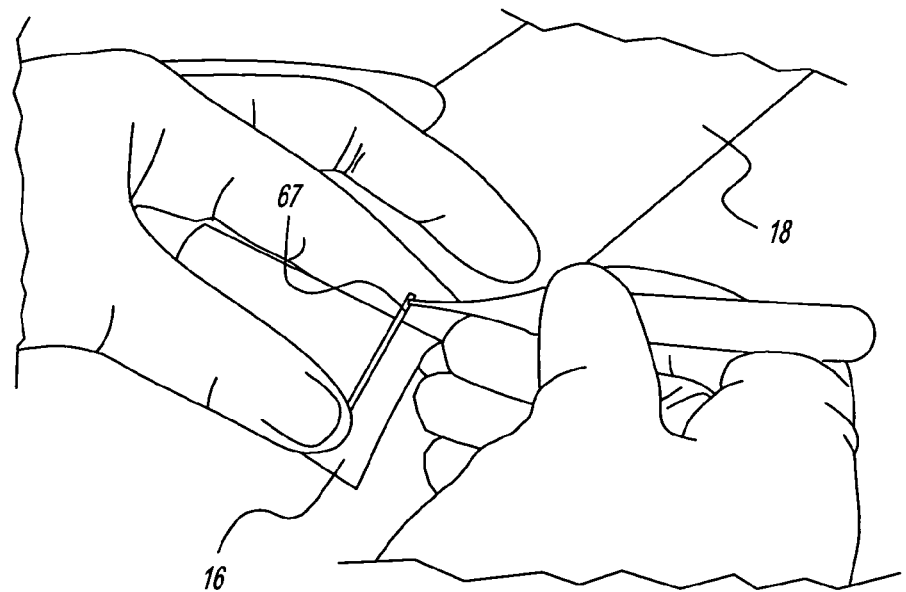
Figure 8F:
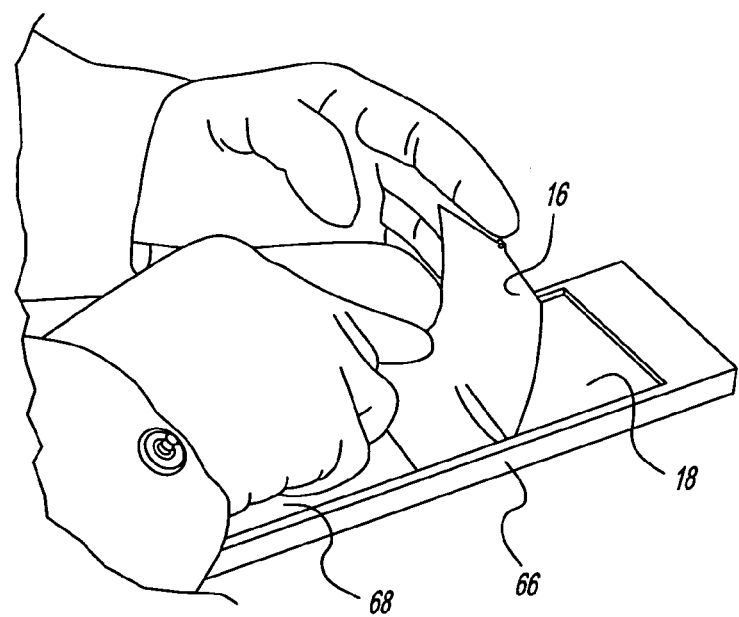

The separator material 65 is folded so as to form a seam at the lower edge 38 of the separator bag as shown in FIG. 8C. FIG. 8D illustrates a spacer 23 having an adhesive on the bottom and a backing on the top. The spacer 23 is positioned on the separator material 65 at the desired location of the lateral seams. In some instances, the spacer 23 is also positioned in the desired location of the lower seam(s) as discussed with respect to FIG. 3. The backing 67 is removed from the strips on the separator material as illustrated in FIG. 8E. The separator material is pressed together so as to bond the first side 16 of the separator bag 14 to the second side 18 of the separator bag 14 as illustrated in FIG. 8F.

Figure 8G:
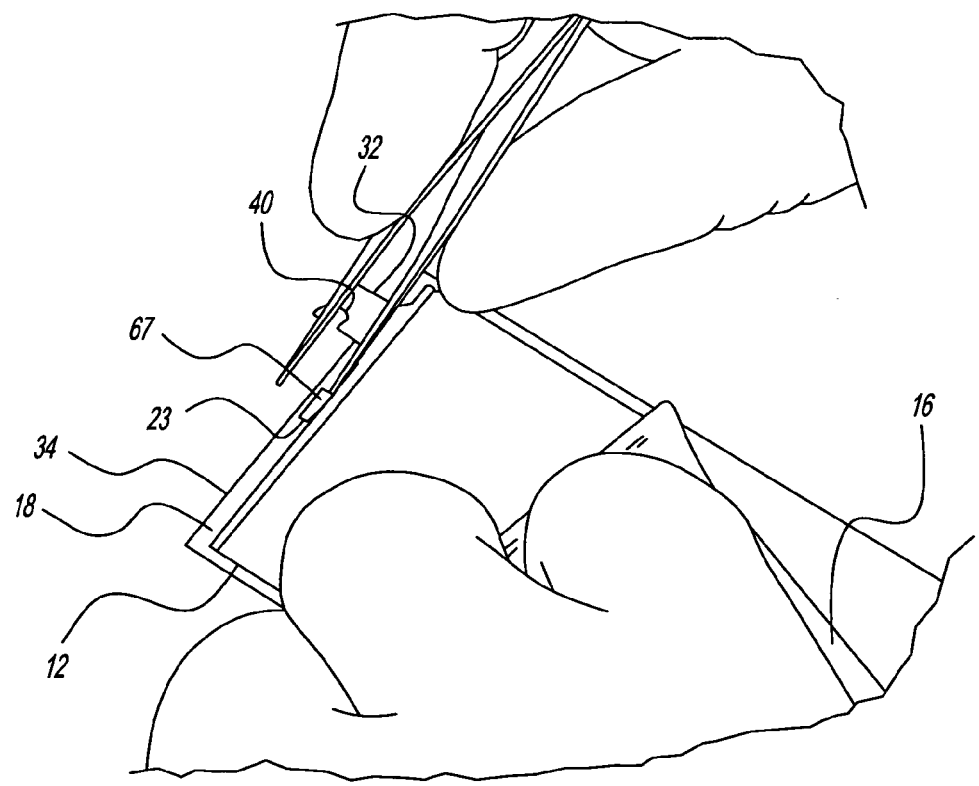

The upper portions of the first side 16 and the second side 18 of the separator bag 14 are separated and the electrode 12 is positioned in the separator bag as illustrated in FIG. 8G. Once the electrode is positioned in the separator bag, a spacer 23 having an adhesive on the bottom and a backing on the top is positioned on the separator material at the desired location of the one or more upper seams. The backing 67 is removed from the strips on the separator material 65 and the separator material is pressed together such that the strip bonds the first side 16 of the separator bag 14 to the second side 18 of the separator bag 14. Accordingly, the spacer 23 shown in FIG. 8G provides a seam along the upper edge 34 of the separator bag 14.

Although the method described with respect to FIG. 8A through FIG. 8G is disclosed as being performed by hand, all or a portion of the disclosed method can also be performed by mechanical and/or automated technologies.

Figure 9A:
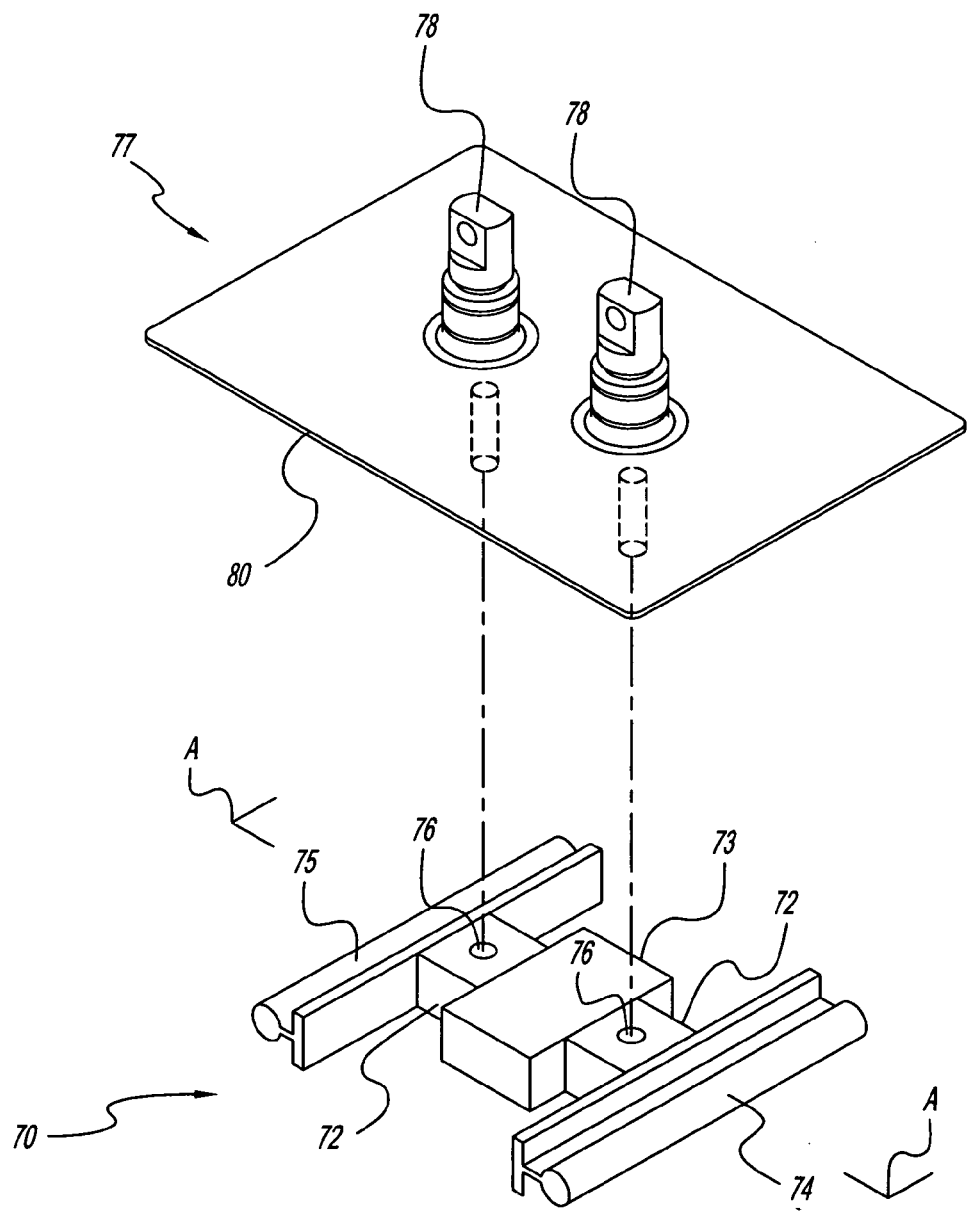
FIG. 9A is a perspective view of a stacking system for creating an electrode stack. The stacking system includes a stacking structure that includes a post on which a plurality of electrodes can be positioned.
Figure 9B:
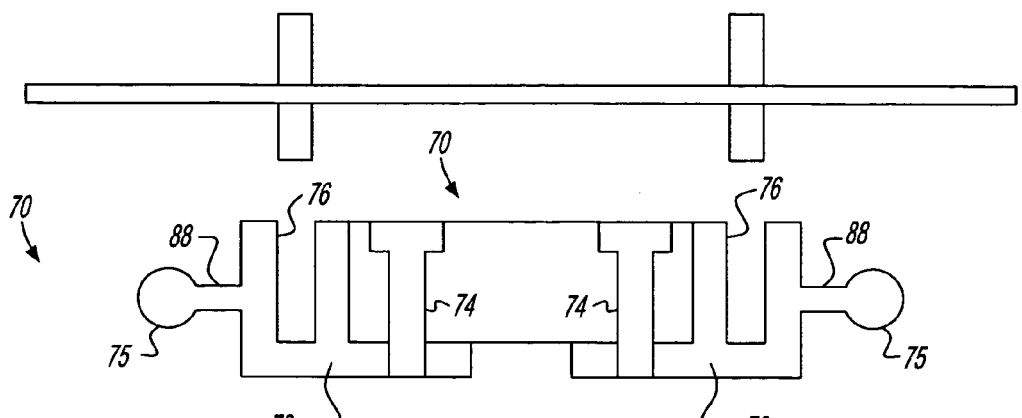
FIG. 9B is a cross section of the stacking system shown in FIG. 9A taken along a line extending between the brackets labeled A.

The electrode systems can be employed in conjunction with a stacking system. FIG. 9A is a perspective view of a suitable stacking system and FIG. 9B is a cross section of the stacking system shown in FIG. 9A taken along a line extending between the brackets labeled A. The stacking system includes a stacking structure 70 for forming a stack having electrodes alternated with electrode systems. The stacking structure includes two electrode-receiving members 72 that are mechanically connected. An insulating member 73 couples the electrode-receiving members 72 such that the electrode-receiving members 72 are electrically isolated from one another. The insulating member can be injection molded. Suitable materials for constructing the insulating member include, but are not limited to, perfluoroalkoxy (PFA).

A variety of techniques can be employed to mechanically connect the electrode receiving members 72 to the insulating member 73. FIG. 9A illustrates holes 74 extending through the insulating member 73 into the electrode receiving members 72. Fastening devices can be inserted into the holes 74 so as to mechanically connect the insulating member 73 and the electrode receiving member 72. In some instances, the fastening devices are threaded screws that can be screwed into the holes 74 so as to immobilize the electrode receiving members 72 relative to the insulating member 73.

Each electrode-receiving member 72 includes a post 75 configured to serve as a current collector. Each electrode-receiving member 72 also includes a recess 76. The electrode-receiving member 72 is configured such that each of the posts 75 is in electrical communication with a material that defines the inside of the recess 76. Accordingly, the posts 75 are in electrical communication with a material inside the recess 76. In some instances, the electrode-receiving members 72 have a one-piece construction. When the electrode-receiving members 72 have a one-piece construction, a suitable material for the electrode-receiving members 72 includes, but is not limited to, Stainless Steel, Al, Ti, and Ni.

The stacking system also includes a cell cover 77 for use with the stacking structure 70. The cell cover 77 includes two feedthrough pins 78 extending through a cover 80. The feedthrough pins and/or the cover 80 are configured such that the feedthrough pins 78 are electrically isolated from one another. Suitable materials for the cover 80 include, but are not limited to, Stainless Steel, Al and Ti. The portion of the pins 78 that is exposed on the top of the 80 cover serves as the terminals for the electrochemical cell and the portion of the pins 78 exposed on the bottom of the cover fit into the recesses 76 on the stacking structure 70. Because a material in the recesses 76 is in electrical communication with the posts 75, positioning the cell cover 77 on the stacking structure 70 provides electrical communication between the feed through pins 78 and the posts 75.

Figure 9C:
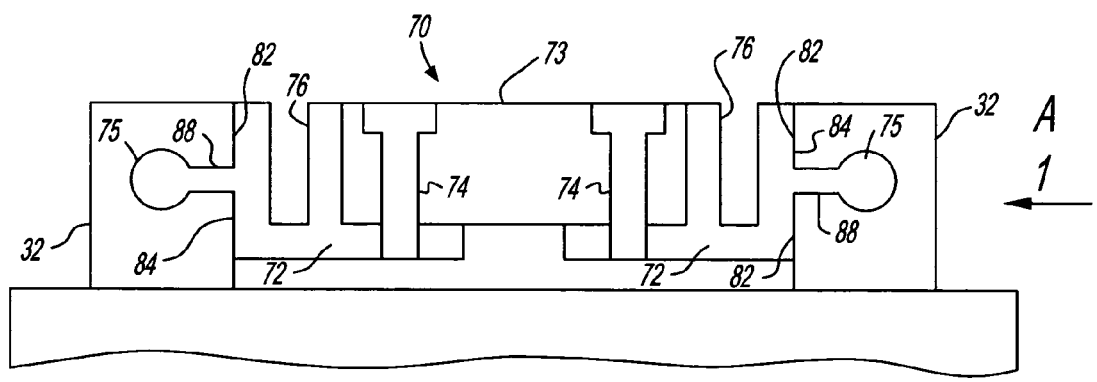
FIG. 9C is a cross section of the stacking structure of FIG. 9A. The stacking structure includes an electrode positioned on a post.
Figure 9D:
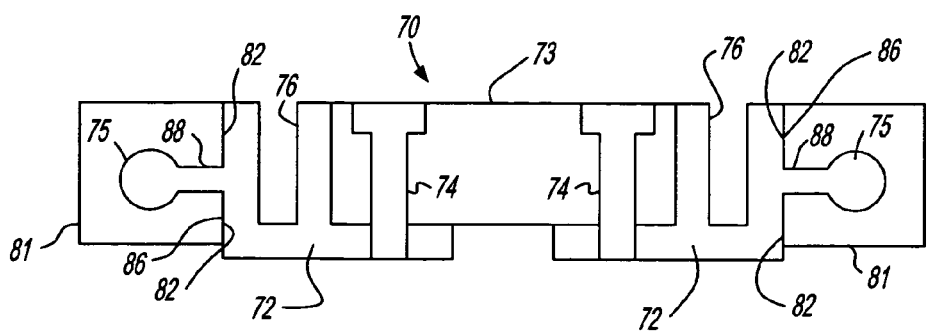
FIG. 9D is a cross section of the stacking structure of FIG. 9A with washers positioned on a post. The stacking structure includes a washer positioned on a post.

The posts 75 are sized such that the tab opening of an electrode 12 can be positioned over the post 75 and slid along the post 75. For instance, FIG. 9C is a cross section of a stacking structure 70 with the tab 32 of an electrode slid along each of the posts 75. In some instances, washers 81 can also be positioned over the post 75 and slid along the post 75. For instance, FIG. 9D is a cross section of a stacking structure with a washer 81 slid along each of the posts 75. The washer 81 can be constructed of an electrically conducting material. Suitable materials for the washers include, but are not limited to, Stainless Steel, Al and Ti.

The posts 75 are attached to an interface side 82 of the electrode receiving member 72. The interface side 82 of the electrode receiving member 72 can be positioned adjacent to an interface side 84 of a tab 32 positioned on the post 75 as shown in FIG. 9C and/or an interface side 86 of a washer 81 positioned on the post 75 as shown in FIG. 9D. The interface side 84 of the tab 32 and/or the interface side 86 of the washer 81 can be constructed so as to have a shape that is complementary to at least a portion of the interface side 82 of the electrode receiving member 72. As a result, the interface side 84 of a tab 32 slid along the post 75 can sit flush against the interface side 82 of the electrode receiving member 72. Additionally, the interface side 86 of a washer 81 slid along the post 75 can sit flush against the interface side 82 of the electrode receiving member 72. The flush positioning of the interface sides can reduce rotation of an electrode and/or a washer around the post 75. This reduced rotation can aid in the alignment of the electrodes that are positioned on a post 75. Additionally or alternatively, the reduced rotation can aid in the alignment of the washers positioned on a post 75. Alignment of the washers can facilitate welding of the washers to one another.

In some instances, a stem 88 connects the post 75 to the interface side 82 of the electrode receiving member 72. As evident in FIG. 9D, the tab opening 40 can have a shape that is complementary to the shape of the stem 88 and the post 75. As a result, the stem 88 can prevent rotation of the electrode around the post 75 and can aid in the alignment of the electrodes positioned on the post 75.

Figure 9E:
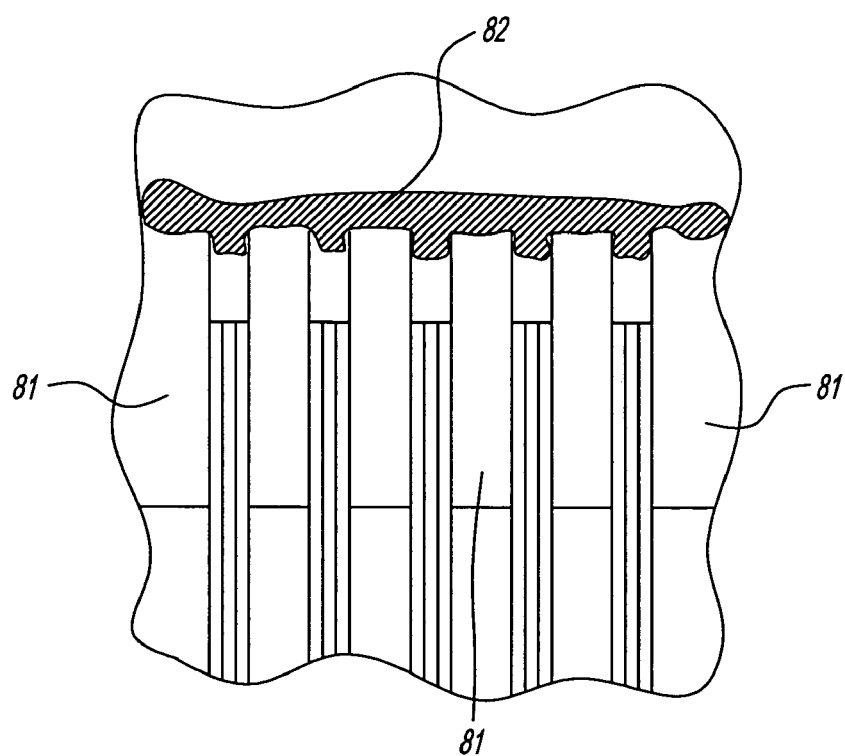
FIG. 9E is a sideview of a portion of the stacking structure shown in FIG. 9C.

The tabs 32 of a plurality of electrodes can be slid along each of the posts 75 as shown in FIG. 9E. FIG. 9E is a sideview of a portion of the stacking structure 70 shown in FIG. 9C taken looking in the direction of the arrow labeled A. The tabs 32 from a plurality of electrodes and washers 81 are slid along a post (not visible) such that a plurality of tabs 32 are positioned between each washer 81. A weld 90 bonds the washers 81 together. The weld 81 can ensure the electrical communication between each of the electrodes and the post and/or immobilize the electrodes relative to one another.

Although FIG. 9A through FIG. 9E illustrate the electrode receiving members having a single post, an electrode receiving member can include a plurality of posts. For instance, an electrode receiving member can include an electrically conducting arm that connects the two posts so they are positioned parallel to one another. Alternatively, the stacking structure can include a plurality of posts in electrical communication with a single recess. These configurations may be used with an electrode having a plurality of tab openings. Examples of electrodes having a plurality of tab openings are disclosed in U.S. patent Ser. No. 10/630,541, filed Jul. 29, 2003, entitled "Battery Electrode Assembly and Fabrication Method Therefor" and incorporated herein in its entirety.

Figure 10A:
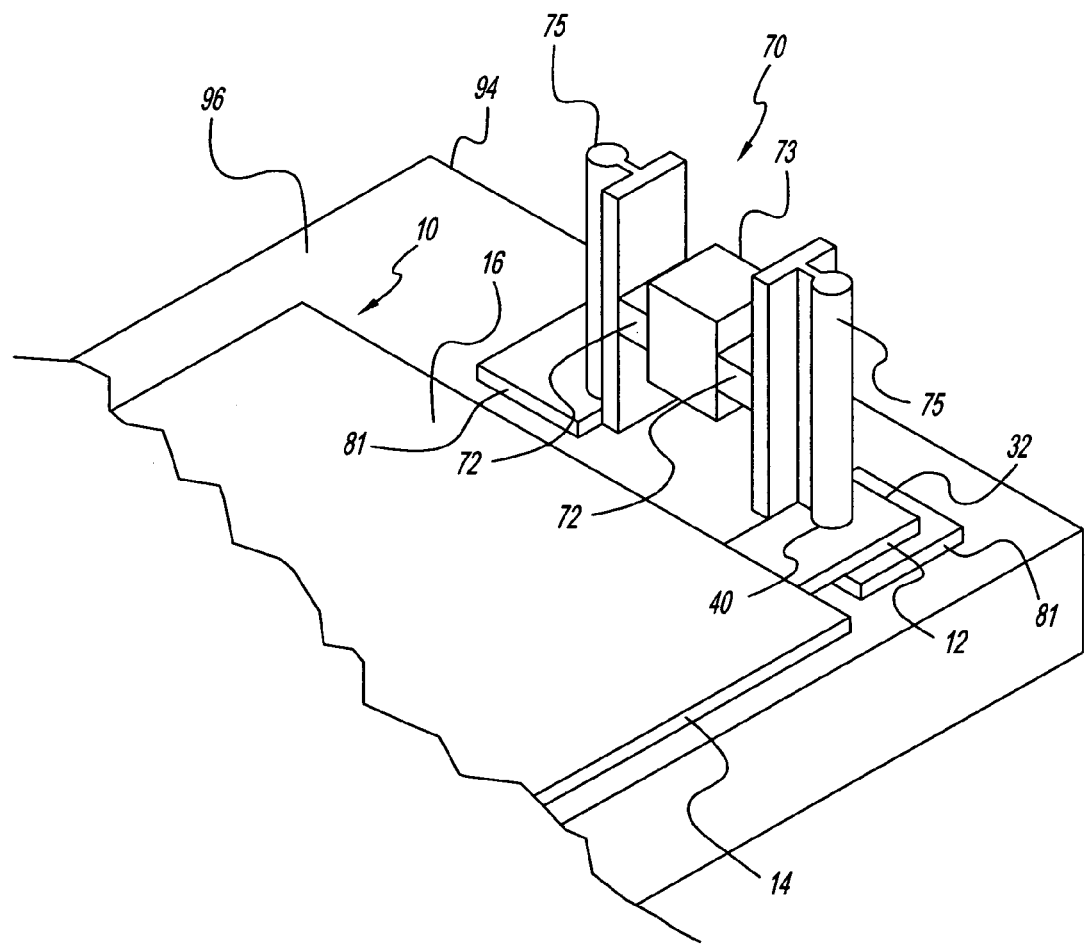
FIG. 10A through FIG. 10C illustrate a method of forming an electrode stack having alternating electrodes positioned in a separator bag.
Figure 10B:
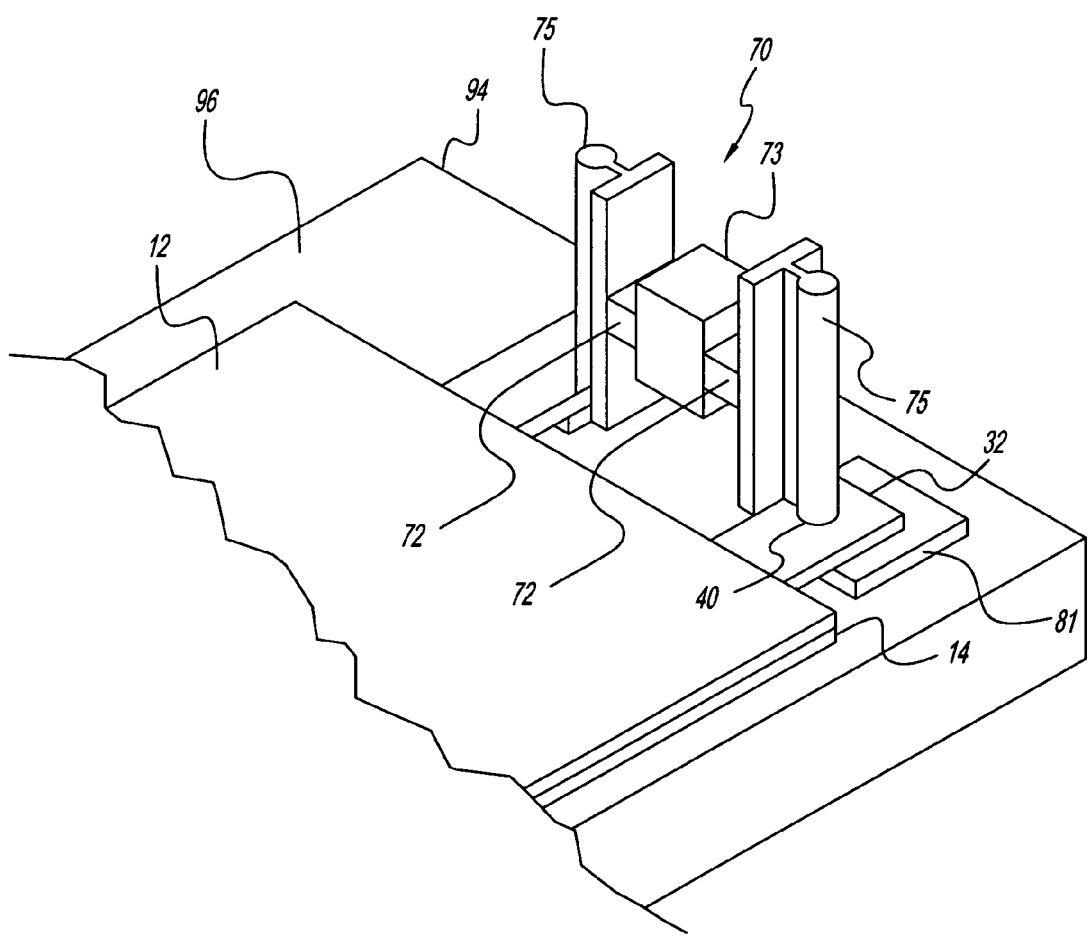
Figure 10C:
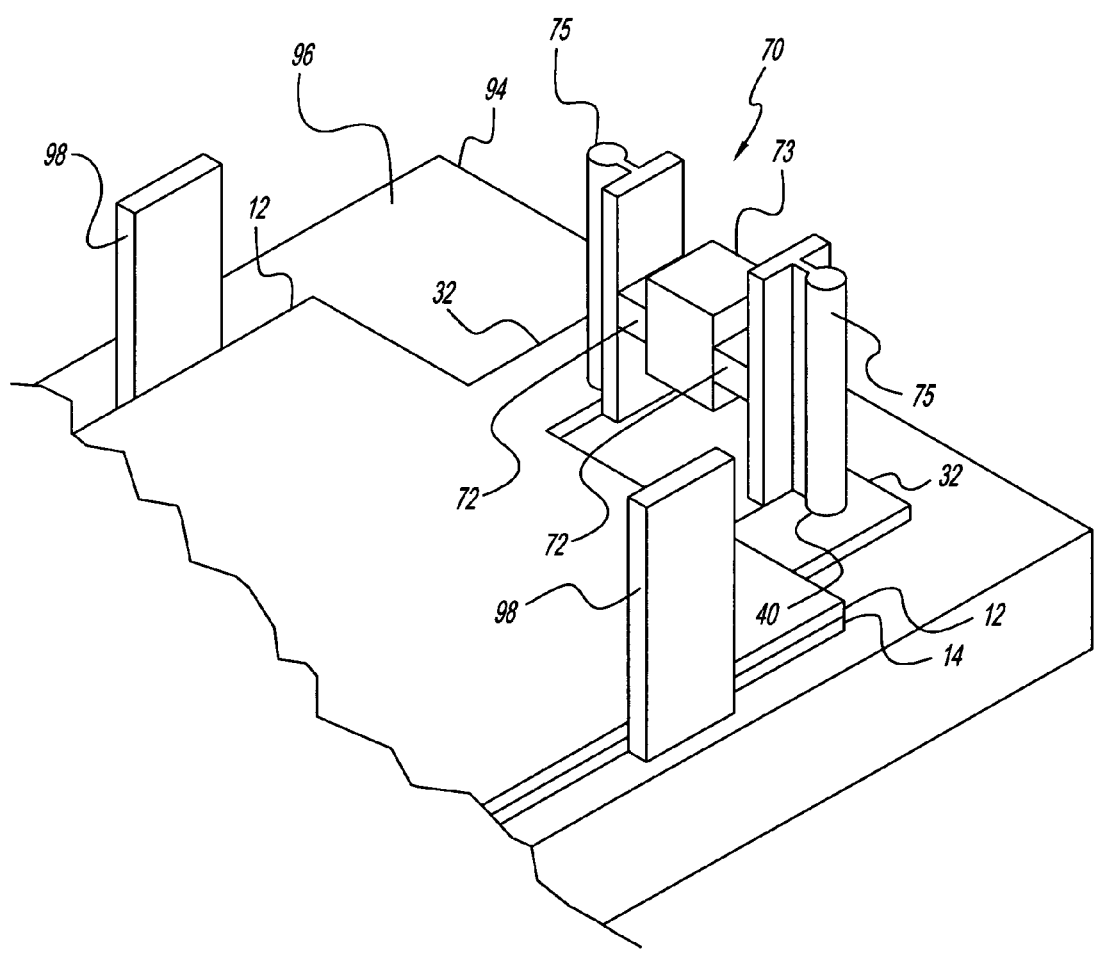

FIG. 10A through FIG. 10C illustrate a method of employing the electrode system and the stacking system to form an electrochemical cell. The stacking structure 70 is removably positioned in a holder 94 having a platform 96 upon which the electrodes 12 can be positioned. A washer 81 is slid along each of the posts 75 until the washers rest on the platform as shown in FIG. 10A. The tab opening 40 of an electrode system is then slid along a post 75 until the tab rests on a washer. The next electrode 12 in the stack is positioned on the electrode system by sliding the tab opening 40 along the other post 75 as illustrated in FIG. 10B. Additional washers and electrodes are added to the stack so as to form an electrode stack of the desired number of electrodes and washers.

The washers can be welded together after formation of the stack. A suitable technique for welding of the washers includes, but is not limited to, laser welding. Although FIG. 9E illustrates the weld positioned on top of the washers, the weld can additionally or alternatively be formed on the sides of the washers.

The holder 94 can include one or more alignment structures 98 as illustrated in FIG. 10C. The alignment structures 98 can be substantially vertical to the platform 96. In some instances, the alignment structures 98 serve to limit the movement of the electrodes 12 on the platform 96 and/or to provide alignments of the electrodes 12 and electrodes 12 structure in one or more directions. Although the alignment structures 98 are shown as being positioned adjacent to the lateral edges of the electrode system, alignment structures 98 can also be positioned adjacent to the lower edge, the upper edge of the electrode system and any other combination of edges.

After the stack has been created, the cell cover 77 is positioned on the stacking structure 70 with the feedthrough pins 78 extending into the recesses 76 on the stacking structure 70 as discussed with respect to FIG. 9A. The resulting electrode stack is removed from the holder 94 of FIG. 10C and the electrode stack is lowered into the electrochemical cell case and the cell cover 77 sealed on the case. The stack can rest one or more structures at the bottom of the cell case. Accordingly, the bottom of the cell case can align the lower edges of the electrode systems 10 with the lower edges of the electrodes 12 that are not positioned in a separator bag 14. The electrolyte can be injected into the case through an opening in the cell cover 77.

Although the above descriptions of the stacking system discloses a plurality of electrodes positioned between each washer on a post, there can be as few as one electrode positioned between one or more pairs of washers. Further, the washers are optional and in some instances, the washers are not employed.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A battery, comprising:
    one or more separator materials formed into a bag having at least two seams,
    the seams positioned so as to define a perimeter of a pocket configured to receive an electrode within the bag,
    the seams being arranged such that at least one gap is formed between seams adjacent to one another along the perimeter of the pocket, and
    at least one of the seams including a spacer positioned between portions of the one or more separator materials joined by the at least one seam.

2. The battery of claim 1, wherein the spacer has a thickness greater than 10 μm along the one or more sides of the spacer that define the pocket.

3. The battery of claim 1, wherein the spacer includes a substrate and an adhesive attaches the substrate to one of the one or more separator materials.

4. The battery of claim 3, wherein the adhesive attaches opposing sides of the substrate to the one or more separator materials.

5. The battery of claim 4, further comprising:
    an electrode positioned in the pocket, the electrode having a tab extending from an edge of the separator bag, the tab including a tab opening extending through the tab and being open to an edge of the tab.

6. The battery of claim 5, wherein the at least two seams include three seams that each includes a spacer and each spacer is positioned adjacent to a different edge of the electrode.

7. The battery of claim 6, wherein the bag has three seams that each include a spacer positioned between portions of the one or more separator materials,
    the electrode has a plurality of edges, and
    each of the three seams that include a spacer is adjacent to a different one the edges.

8. The battery of claim 7, wherein the at least two seams include a fold in the separator material serving as one of the seams.

9. The battery of claim 3, wherein the adhesive includes one or more components selected from the group consisting of acrylic, rubber, cellulose and silicone.

10. The battery of claim 1, wherein the seams define a pocket configured to surround an electrode within the pocket.

11. The battery of claim 1, wherein at least one fold in the separator material serves as one of the seams.

12. The battery of claim 11, wherein the at least one gap is defined by the fold and by the spacer.

13. The battery of claim 1, wherein the bag has an envelope shape.

14. The battery of claim 1, wherein at least one of the separator materials includes one or more components selected from the group consisting of polypropylene and polyethylene.

15. The battery of claim 1, further comprising:
    an electrode positioned in the pocket and wherein the separator bag includes a lower edge extending between lateral edges, the bag also including one or more lateral seams positioned along a lateral edge of the separator bag and at least one lower seams positioned along the lower edge of the separator bag, the one or more lateral seams not being positioned above a distance equal to 50% of the electrode height from the lower seam, the electrode height being measured along the edge of the electrode adjacent to the lateral seam.

16. The battery of claim 1, further comprising;
    an electrode positioned in the pocket, the electrode having a tab extending from an edge of the separator bag, the tab including a tab opening extending through the tab.

17. The battery of claim 1, further comprising:
    an electrode positioned in the pocket, the spacer has a thickness greater than 20% of the electrode thickness.

18. The battery of claim 1, further comprising:
    an electrode positioned in the pocket, the spacer has a thickness in a range of 80% to 120% of the electrode thickness.

19. A battery, comprising:
    an electrode; and
    one or more separator materials formed into a bag having at least two seams that immobilize one portion of the one or more separator materials relative to another portion of the one or more separator materials, the seams defining a perimeter of a pocket that surrounds the electrode.

20. The battery of claim 19, wherein the seams define four sides of a pocket, each of the pocket sides being adjacent to an edge of the electrode.

21. The battery of claim 19, wherein at least one of the seams includes a spacer positioned between portions of the separator material immobilized by the at least one seam.

22. The battery of claim 21, wherein the spacer has a thickness greater than 10 μm along the one or more sides of the spacer that define the pocket.

23. The battery of claim 21, wherein the spacer includes a substrate and an adhesive attaches the substrate to one of the one or more separator materials.

24. The battery of claim 23, wherein the adhesive includes one or more components selected from the group consisting of acrylic, rubber, cellulose and silicone.

25. The battery of claim 19, wherein one or more of the separator materials includes one or more components selected from the group consisting of polypropylene and polyethylene.

26. The battery of claim 19, wherein the separator bag includes a lower edge extending between lateral edges, the bag also including one or more lateral seams positioned along a lateral edge of the separator bag and at least one lower seams positioned along the lower edge of the separator bag, the one or more lateral seams not being positioned above a distance from the lower seam, the distance being equal to 50% of the electrode height, the electrode height being measured along the edge of the electrode adjacent to the lateral seam.

27. The battery of claim 19, wherein the electrode includes at least one tab extending from a side of the bag, the tab includes an opening extending through the tab.

28. The battery of claim 19, further comprising:
    an electrode having multiple edges positioned in the pocket;

the at least two seams including three seams that each includes a spacer positioned between portions of the separator material; and each of the three seams that include a spacer being adjacent to a different one the edges.

29. A battery, comprising:

one or more separator materials formed into a bag having seams that immobilize one portion of the one or more separator materials relative to another portion of the one or more separator materials, the seams positioned so as to define a perimeter of a pocket configured to receive an electrode; and an electrode positioned within the pocket, the electrode having a tab extending from the bag, a tab opening extending through the tab and being open to an edge of the tab.

30. The battery of claim 29, wherein at least one of the seams includes a spacer positioned between portions of the separator material joined by the at least one seam.

31. The battery of claim 30, wherein the spacer includes a substrate and an adhesive attaches the substrate to one of the one or more separator materials.

32. The battery of claim 29, wherein the spacer has a thickness greater than 10 μm along the one or more sides of the spacer that define the pocket.

33. The battery of claim 29, wherein the separator bag includes a lower edge extending between lateral edges, the bag also including one or more lateral seams positioned along a lateral edge of the separator bag and at least one lower seams positioned along the lower edge of the separator bag, the one or more lateral seams not being, positioned above a distance equal to 50% of the electrode height from the lower seam, the electrode height being measure along the edge of the electrode adjacent to the lateral seam.

34. A method of forming battery, comprising:

joining regions of one or more separator materials so as to form the seams of a separator bag, the seams being positioned so as to define a perimeter of a pocket configured to receive an electrode within the bag, the seams being arranged such that at least one gap is formed between seams adjacent to one another along the perimeter of the pocket, and at least one of the seams formed so as to include a spacer positioned between regions of the separator material joined by the at least one seam.

35. The method of claim 34, wherein the at least one seam is formed so as to have a thickness greater than 10 μm along the one or more sides of the spacer that define the pocket.

36. The method of claim 34, further comprising:

positioning an electrode in the pocket; and forming at least one additional seam joining regions of the one or more separator materials after positioning the electrode in the pocket.

37. The method of claim 36, wherein the at least one additional seam acts with the other seams to define a pocket surrounding the electrode.

38. The method of claim 34, further comprising:

positioning an electrode in the pocket, the electrode including a tab with a tab opening extending through the electrode; and positioning the electrode on a post of an electrode receiving member such that the post extends through the tab opening.

* * * * *